United States Patent
Iizuka

(10) Patent No.: US 10,229,217 B2
(45) Date of Patent: Mar. 12, 2019

(54) COMMUNICATION APPARATUS, COMMUNICATION SYSTEM, SERVER, COMMUNICATION METHOD AND NON-TRANSITORY RECORDING MEDIUM

(71) Applicant: CASIO COMPUTER CO., LTD., Shibuya-ku, Tokyo (JP)

(72) Inventor: Nobuo Iizuka, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 150 days.

(21) Appl. No.: 15/031,888

(22) PCT Filed: Oct. 15, 2014

(86) PCT No.: PCT/JP2014/005234
§ 371 (c)(1),
(2) Date: Apr. 25, 2016

(87) PCT Pub. No.: WO2015/068335
PCT Pub. Date: May 14, 2015

(65) Prior Publication Data
US 2016/0267195 A1    Sep. 15, 2016

(30) Foreign Application Priority Data
Nov. 7, 2013   (JP) .................. 2013-231138

(51) Int. Cl.
*G06K 7/10* (2006.01)
*G06K 7/14* (2006.01)
(Continued)

(52) U.S. Cl.
CPC ... *G06F 17/30879* (2013.01); *G06K 7/10564* (2013.01); *G06K 7/1417* (2013.01);
(Continued)

(58) Field of Classification Search
CPC . G06F 17/30879; H04L 67/146; H04L 67/02; G06K 7/1417; G06K 7/10564; G06Q 10/20; G06Q 30/016
See application file for complete search history.

(56) References Cited

U.S. PATENT DOCUMENTS 7,716,526 B2   5/2010   Tanimura
9,047,759 B2   6/2015   Yamada et al.
(Continued)

FOREIGN PATENT DOCUMENTS

CN    102801471 A    11/2012
JP    2006285456 A   10/2006
(Continued)

OTHER PUBLICATIONS

International Search Report (ISR) and Written Opinion (WO) dated Feb. 3, 2015 issued in International Application No. PCT/JP2014/005234.
(Continued)

Primary Examiner — Sonji N Johnson
(74) Attorney, Agent, or Firm — Holtz, Holtz & Volek PC

(57) ABSTRACT

A light receiver of a communication apparatus receives light from an LED that emits light based on a light-emission pattern defined by an ID. An ID acquirer specifies the light-emission pattern from light received by the light receiver and acquires the ID. A transceiver transmits the acquired ID to a service server that stores an ID/URL table associating together the ID and a URL of information relating to equipment equipped with the LED, and receives a corresponding URL. An information acquirer acquires the information relating to the equipment based on the URL received by the transceiver.

17 Claims, 13 Drawing Sheets

(51) Int. Cl.
  *G06F 17/30* (2006.01)
  *G06Q 10/00* (2012.01)
  *G06Q 30/00* (2012.01)
  *H04L 29/08* (2006.01)

(52) U.S. Cl.
  CPC ........... *G06Q 10/20* (2013.01); *G06Q 30/016* (2013.01); *H04L 67/02* (2013.01); *H04L 67/146* (2013.01)

(56) References Cited

U.S. PATENT DOCUMENTS

| | | |
|---|---|---|
| 9,142,122 B2 | 9/2015 | Oshima et al. |
| 9,262,913 B2 | 2/2016 | Yamada et al. |
| 2002/0161745 A1 | 10/2002 | Call |
| 2006/0056855 A1 | 3/2006 | Nakagawa et al. |
| 2006/0239675 A1 | 10/2006 | Iizuka et al. |
| 2013/0299571 A1* | 11/2013 | Metso .................... G06F 17/30 235/375 |

FOREIGN PATENT DOCUMENTS

| | | |
|---|---|---|
| JP | 2007041840 A | 2/2007 |
| JP | 2008083996 A | 4/2008 |
| JP | 2013088943 A | 5/2013 |
| WO | 2012070251 A1 | 5/2012 |

OTHER PUBLICATIONS

Japanese Office Action dated Jul. 28, 2015 issued in counterpart Japanese Application No. 2013-231138.
European Office Action dated Jan. 4, 2018 issued in counterpart European Application No. 14799028.7.

* cited by examiner

| STATUS | ID | LIGHT-EMISSION PATTERN |
|---|---|---|
| POWER SUPPLY ERROR | 10 | FLASHING A |
| OPERATION ERROR | 11 | FLASHING B |
| ... | ... | ... |
| ... | ... | ... |

| ACQUISITION DATE AND TIME | ID HISTORY |
|---|---|
| 10/1/2013, 12:00 | 11 |
| 10/3/2013, 16:00 | 10 |

| ID | RULE APPLICATION CONDITION | APPLICATION RULE |
|---|---|---|
| 10 | SAME ERROR OCCURS WITHIN 24 HOURS | SUBSTITUTE ID "539" |

FIG.6

| ID | INSTRUCTION CONTENTS TO APPARATUS | URL | CONTENTS AT URL SOURCE |
|---|---|---|---|
| 10 | AUTOMATIC ACQUISITION OF INFORMATION RELATING TO SUPPORT | http://www.OO.XXjp/ID10 | WEB PAGE POSTING "AN ERROR AT STARTUP CAUSED BY SOME FACTOR OCCURRED. FIND THE POWER SOURCE AND RESTART THE DEVICE" |
| 11 | AUTOMATIC ACQUISITION OF INFORMATION RELATING TO SUPPORT | http://www.OO.XXjp/ID11 | VIDEO FOR SUPPORTING REPAIR OF OPERATION ERROR |
| ... | ... | ... | ... |
| ... | ... | ... | ... |
| 539 | AUTOMATIC ACQUISITION OF INFORMATION RELATING TO SUPPORT + COMMUNICATE USER INFORMATION AND STATUS INFORMATION | http://www.OO.XXjp/ID539 & userinfo= XXXXX & status = XXXXXX | WEB PAGE OF GUIDANCE SCREEN FOR GUIDING INQUIRIES TO SUPPORT CENTER |

321

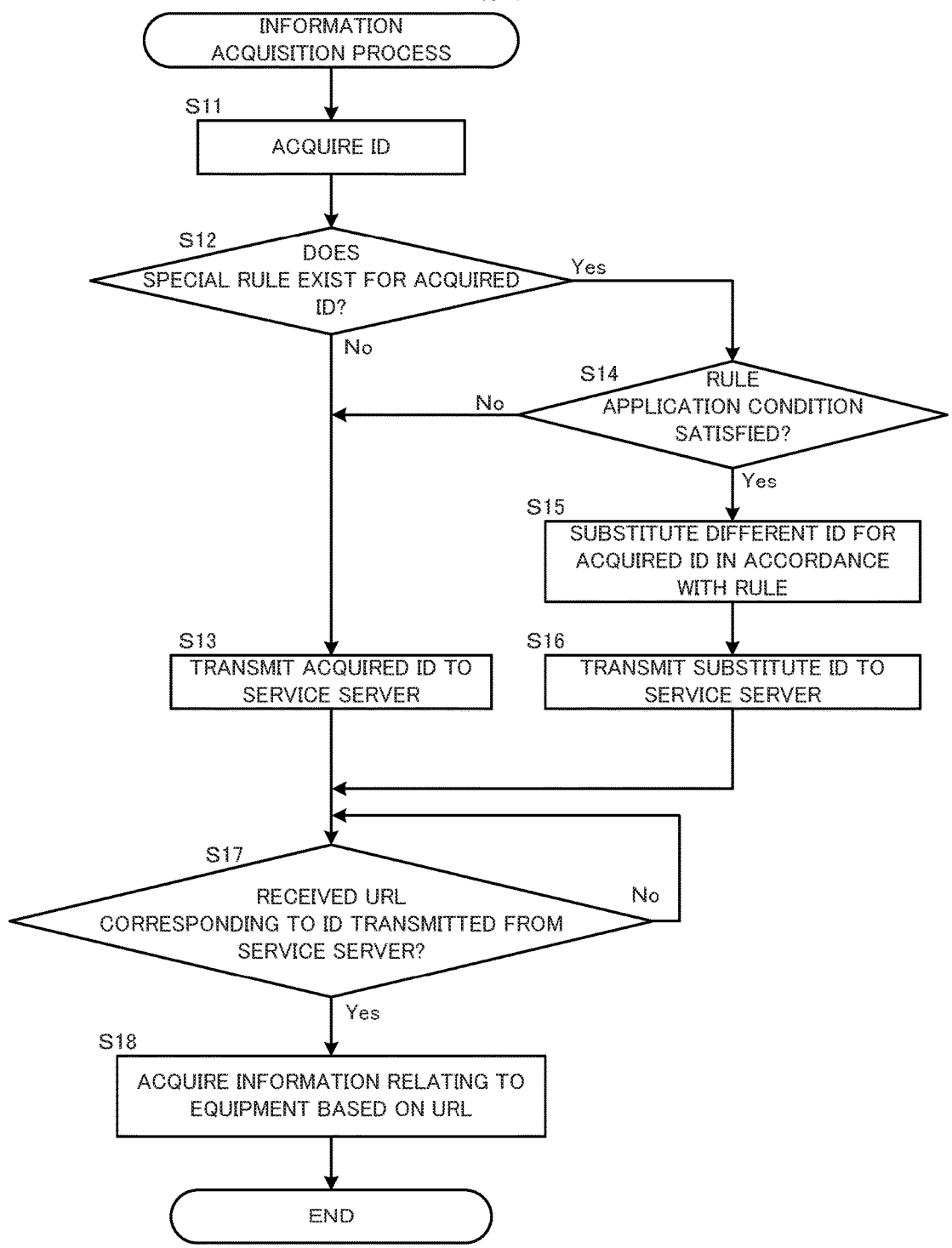

FIG.10

| | |
|---|---|
| 10-40 | EQUIPMENT 100 OF MAKER A |
| UNASSIGNED | |
| 100-120 | EQUIPMENT X OF MAKER B |
| UNASSIGNED | |
| 500-540 | EQUIPMENT 100 OF MAKER A |
| UNASSIGNED | |
| 1000-1010 | EQUIPMENT Y OF MAKER C |

FIG.11

ENTRY OF SPECIAL RULE

| ENTRY DATE/TIME | ID MAPPING RANGE | ID | RULE APPLICATION CONDITION | APPLICATION RULE |
|---|---|---|---|---|
| 9/25/2013 10:00 | 10-40 | 10 | SAME ERROR OCCURS WITHIN 24 HOURS | SUBSTITUTE WITH ID "539" |

FIG.14

| USER ID | DATE/TIME RECEIVED | ID HISTORY |
|---|---|---|
| A | 10/1/2013 12:00 | 11 |
| A | 10/3/2013 16:00 | 10 |
| B | 10/5/2013 21:00 | 11 |
| ... | ... | ... |

COMMUNICATION APPARATUS, COMMUNICATION SYSTEM, SERVER, COMMUNICATION METHOD AND NON-TRANSITORY RECORDING MEDIUM

TECHNICAL FIELD

The present disclosure relates to a communication apparatus, communication system, server, communication method and non-transitory recording medium.

BACKGROUND ART

Methods of supporting access to information related to equipment (for example, an information appliance and/or the like) have been disclosed from before.

For example, in Patent Literature 1, in order to support access to data in instructions for handling equipment (hereafter called handling instructions), a QR Code R is attached to the equipment and that QR code is read by a camera-equipped mobile phone and/or the like. The camera-equipped mobile phone that reads the QR code converts the QR code into a URL and accesses the data of the handling instructions.

CITATION LIST

Patent Literature

[PTL 1]
Unexamined Japanese Patent Application Kokai Publication No. 2008-083996

SUMMARY OF INVENTION

Technical Problem

However, with the method of the above-described Patent Literature 1, only access to the handling instructions data was supported, and analysis of breakdowns and/or the like had to be accomplished by the user on their own.

Consequently, the problem existed that the manufacturer was unable to provide detailed support.

In consideration of the foregoing, it is an objective of the present disclosure to provide a communication apparatus and/or the like offering convenience to the user and enabling detailed support.

Solution to Problem

In order to achieve the above objective, the communication apparatus according to a first aspect of the present disclosure comprises
light-receiving means for receiving light from a light-emitting body that emits light based on light-emission patterns defined by definition information;
first acquisition means for specifying the light-emission patterns from light received by the light-receiving means and acquiring the definition information; and
second acquisition means for transmitting the definition information acquired by the first acquisition means to external information management means, and acquiring information relating to equipment equipped with the light-emitting body, based on results responding to the transmission.

In addition, the communication system according to a second aspect of the present disclosure is a communication system, comprising equipment equipped with a light-emitting body for emitting light based on light-emission patterns defined by definition information, a server that associates the definition information and information relating to the equipment existing on a network, and a communication apparatus equipped with light receiving means for receiving light from the light-emitting body, this communication system being such that:
the communication apparatus comprises
first acquisition means for specifying the light-emission patterns from light received by the light-receiving means and acquiring the definition information; and
definition information transmission means for transmitting to the server the definition information acquired by the first acquisition means;
the server comprises
definition information receiving means for receiving the definition information transmitted by the definition information transmission means; and
acquisition control means for causing the information relating to the equipment to become acquirable by the communication apparatus, based on the definition information received by the definition information receiving means; and
the communication apparatus further comprises second acquisition means for the information relating to the equipment as a result of the acquisition control means accomplishing control.

In addition, the server according to a third aspect of the present disclosure is a server in a communication system comprising equipment equipped with a light-emitting body for emitting light based on light-emission patterns defined by definition information, a server that associates the definition information and information relating to the equipment existing on a network, and a communication apparatus equipped with light receiving means for receiving light from the light-emitting body, the server comprising definition information receiving means for receiving definition information defining the light-emission patterns from a communication apparatus that receives light having the light-emission patterns; and
acquisition control means for enabling information relating to the equipment to be received by the communication apparatus, based on the definition information received by the definition information receiving means.

In addition, the communication method according to a fourth aspect of the present disclosure includes
a light-receiving step for receiving light from a light-emitting body that emits light based on light-emission patterns defined by definition information;
a first acquisition step for specifying the light-emission pattern from light received in the light-receiving step and acquiring the definition information; and
a second acquisition step for transmitting the definition information acquired in the first acquisition step to external information management means, and acquiring information relating to equipment equipped with the light-emitting body, based on the results of the response to the transmission.

In addition, the non-transitory recording medium according to a fifth aspect of the present disclosure is a non-transitory recording medium on which a computer-readable program is recorded, the program causing a computer to function as
first acquisition means for specifying light-emission patterns of light emitting from a light-emitting body, and acquiring definition information defining the light-emission patterns; and
second acquisition means for transmitting the definition information acquired by the first acquisition means to external information management means, and acquiring information relating to equipment equipped with the light-emitting body, based on the results of the response to the transmission.

Advantageous Effects of Invention

With the present disclosure, it is possible to offer convenience to the user and enable detailed support.

BRIEF DESCRIPTION OF DRAWINGS

FIG. 3 is a drawing showing one example of a light-emission pattern table.

FIG. 4 is a drawing showing one example of an ID history table.

FIG. 5 is a drawing showing one example of a special rule table.

FIG. 6 is a drawing showing one example of an ID/URL table.

FIG. 9 is a flowchart showing one example of the flow of the information acquisition process.

FIG. 10 is a drawing showing one example of the ID space.

FIG. 11 is a drawing showing one example of entry of a special rule.

FIG. 14 is a drawing showing a different example of the ID history table.

DESCRIPTION OF EMBODIMENTS

Below, the exemplary embodiment of the present disclosure is described with reference to the drawings.

Figure 1:
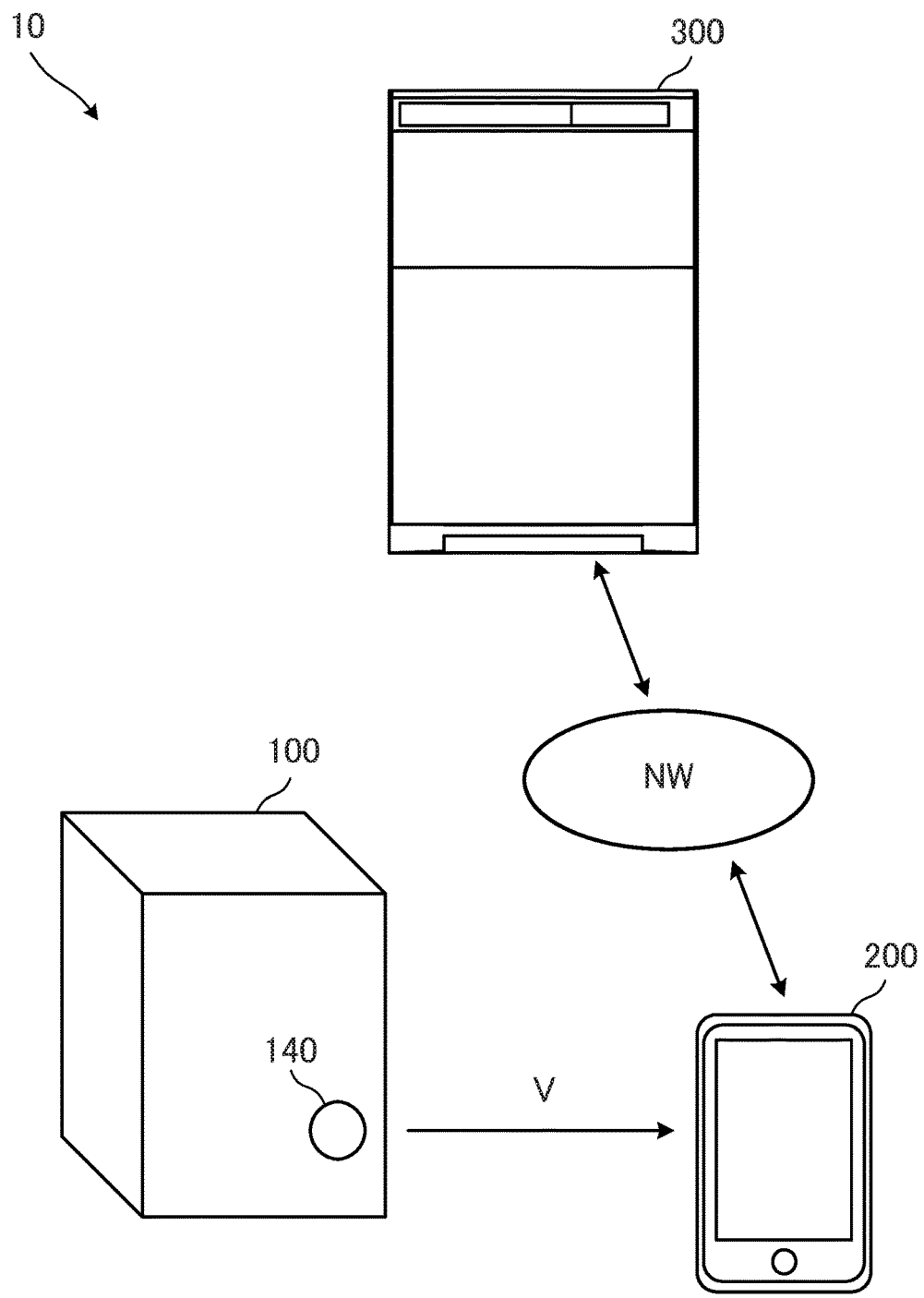
FIG. 1 is a drawing schematically showing the composition of a communication system according to an exemplary embodiment of the present disclosure.

As shown in FIG. 1, a communication system 10 comprises equipment 100, a communication apparatus 200 and a service server 300.

The equipment 100 is an information appliance provided with an LED (Light Emitting Diode) 140 that is a light-emitting body. The equipment 100 does not comprise a display device such as a display. In addition, the LED 140 normally lights up with a green color other than at times of abnormalities such as the occurrence of errors.

The communication apparatus 200 is an apparatus capable of wireless communication (for example, a mobile phone, a smartphone and/or the like). The communication apparatus 200 accomplishes wireless communication through visible light V (hereafter called visible light communication) with the equipment 100. In addition, the communication apparatus 200 accomplishes wireless communication with the service server 300 via a network NW through a standard such as LTE (Long Term Evolution), 3G and/or the like.

The service server 300 is a server that stores position information (URLs) indicating where on the network NW information relating to the equipment 100 resides, such as support information for the equipment 100. The service server 300 provides the URLs in response to inquiries from the communication apparatus 200. A detailed method of providing such is described below.

Figure 2:
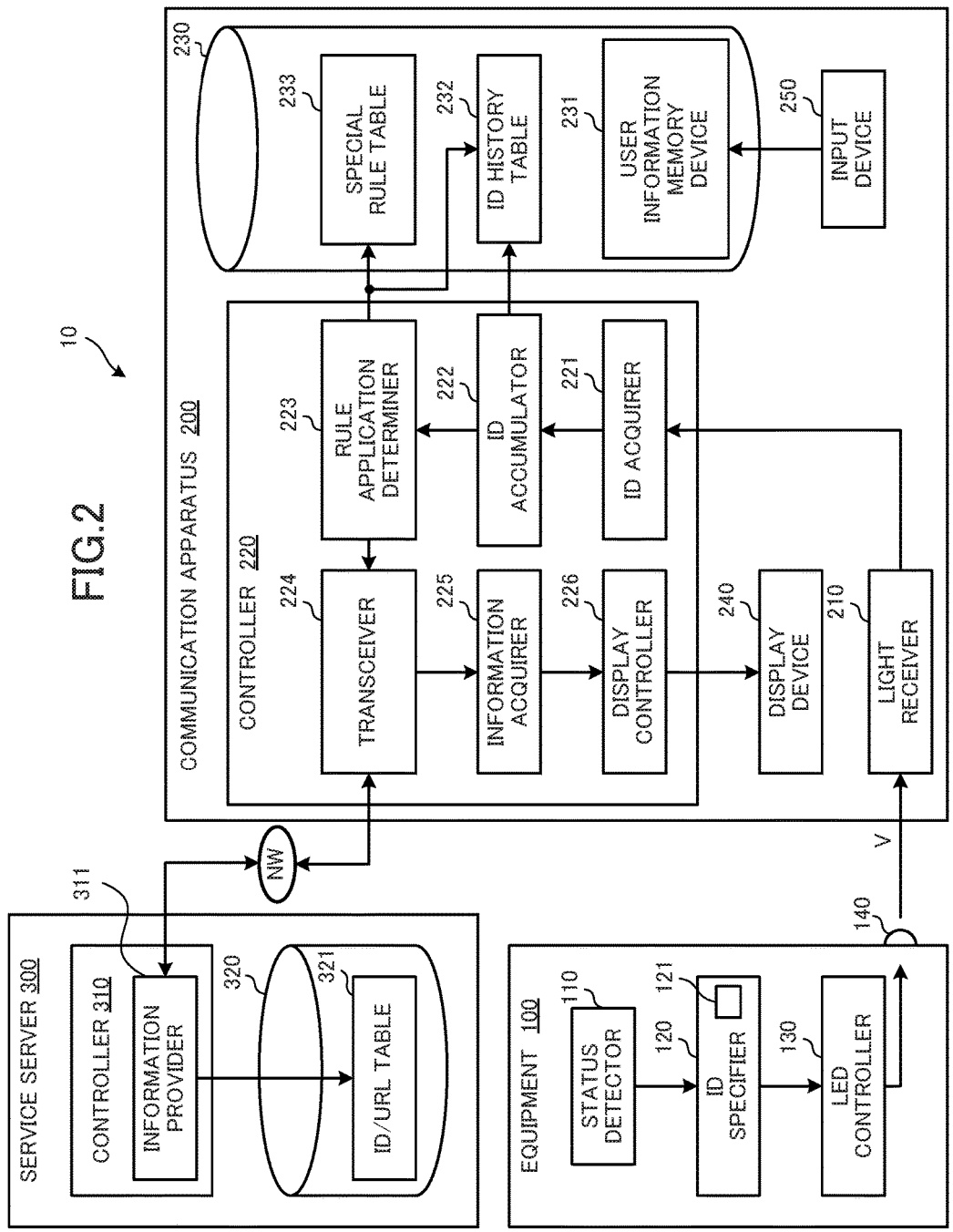
FIG. 2 is a block diagram showing the composition of the communication system of FIG. 1.

Next, the equipment 100, the communication apparatus 200 and the service server 300 comprising the communication system 10 are described with reference to FIG. 2. The equipment 100 comprises a status detector 110, an ID specifier 120, and an LED controller 130, in addition to the LED 140 and basic functions as an information appliance.

The status detector 110 detects the status (for example, error status, setting status and/or the like) of the equipment 100.

The ID specifier 120 comprises a light-emission pattern table 121 (described below), and specifies an ID that is definition information defining the light-emission pattern of the LED 140. Specifically, the ID specifier 120 specifies an ID determined in accordance with the status of the equipment 100, with reference to the light-emission pattern table 121 shown in FIG. 3. For example, when the status detector 110 has detected a power supply error, the ID specifier 120 refers to the light-emission pattern table 121 and specifies the ID "10".

The LED controller 130 controls the LED 140 so as to achieve the light-emission pattern defined by the ID specified by the ID specifier 120. For example, when the ID specifier 120 has specified the ID "10", the LED controller 130 controls the LED 140 so as to go from being lit with a green light to the light-emission pattern "flashing A". The light-emission pattern indicates the regularity of chronological changes (luminosity changes, color changes and/or the like) in the visible light V. Based on this light-emission pattern, the LED controller 130 performs control so that the visible light V emitted from the LED 140 becomes "flashing A" by modulating the luminosity of the light. The LED controller 130 is not restricted to luminosity modulation and may also cause changes in the color of light emitted from the LED 140 by accomplishing wavelength modulation.

The status detector 110, the ID specifier 120 and the LED controller 130 of the equipment 100 are realized by including integrated circuit substrates such as special ASICs (Application Specific Integrated Circuits) and/or the like manufactured for application to visible light communication into the equipment 100 in advance, such as at the time of shipment from the factory.

Next, the communication apparatus 200 comprises a light receiver 210, a controller 220, a memory device 230, a display device 240 and an input device 250.

The light receiver 210 is an image sensor comprising a CCD (Charge Coupled Device), a CMOS (Complementary Metal Oxide Semiconductor) and/or the like. The light receiver 210 generates an analog electric signal in accordance with the intensity of light received.

The controller 220 comprises a CPU, ROM, RAM and/or the like, and comprises an ID acquirer 221, an ID accumulator 222, a rule application determiner 223, a transceiver 224, an information acquirer 225 and a display controller 226. A user of the communication apparatus 200 installs a program of an application for acquiring information related to support in the ROM in advance. Furthermore, the CPU reads and executes the program stored in the ROM, and realizes the various above-described functions.

The ID acquirer 221 acquires an ID by specifying a light-emission pattern for the visible light V from light received by the light receiver 210 as an image. Specifically, the ID acquirer 221 generates a bit data string by converting the analog electrical signal of light received by the light receiver 210 into a digital electrical signal. With this exemplary embodiment, the LED 140 flashes, so a bit data string of "0" when the light is off and "1" when the light is on is generated, and by analyzing the regularity thereof, the ID acquirer 221 acquires an ID specifying the light-emission pattern of the LED 140. In addition, when the ID is acquired, the light-emission pattern and the ID are correlated and the ID corresponding to the specified light-emission pattern is acquired. When the LED 140 changes the light-emission color among the three colors red, green and blue, a bit data string based on the order of light-emission of these three colors is generated, and the ID acquirer 221 acquires the ID by analyzing the regularity thereof.

The ID accumulator 222 accumulates the IDs acquired by the ID acquirer 221 in the memory device 230 comprising a non-volatile hard disk and/or the like. Specifically, the ID accumulator 222 accumulates the acquired IDs in an ID history table 232 shown in FIG. 4.

The ID history table 232 comprises acquisition dates and times showing past ID acquisition dates and times, and an ID history showing ID histories acquired at the acquisition dates and times. In the example of FIG. 4, two past ID histories are shown, and for example if the ID acquired this time is the ID "10", the acquisition date and time along with the ID "10" are added to and stored in the ID history table 232.

The rule application determiner 223 determines whether or not the IDs acquired by the ID acquirer 221 satisfy prescribed conditions. Specifically, the rule application determiner 223 determines whether or not a rule application condition is satisfied with reference to a special rule table 233 shown in FIG. 5 and the ID history table 232. Furthermore, when the rule application condition is satisfied, the rule application determiner 223 substitutes the acquired ID with an ID specified by the application rule.

For example, when the ID acquired this time is the ID "10" and "10" is newly added to the ID history of the ID history table 232 along with the acquisition date and time, the rule application determiner 223 determines for the ID "10" whether or not the same error occurs within 24 hours," based on the acquisition date and time of two ID histories "10" in the ID history table 232. When the rule application condition is satisfied, the rule application determiner 223 substitutes the ID "539" for the ID "10". In addition, the update process for the special rule table 233 of FIG. 5 is described below.

The transceiver 224 transmits the acquired ID or the substituted ID to the service server 300, and receives a URL corresponding to the transmitted ID from the service server 300. For example, when the rule application determiner 223 has not substituted for the ID "10", the transceiver 224 transmits the ID "10" and, when the rule application determiner 223 has substituted for the ID "10", transmits the ID "539", to the service server 300.

On the other hand, the service server 300 comprises a controller 310 and a memory device 320.

The controller 310 comprises a CPU, and ROM, RAM and/or the like, and is provided with an information provider 311. The function of the information provider 311 is realized by the CPU reading and executing a program for providing information stored in the ROM.

The information provider 311 specifies the URL corresponding to the ID received from the communication apparatus 200 with reference to an ID/URL table 321 of FIG. 6 stored by the memory device 320, and transmits the specified URL to the communication apparatus 200.

The ID/URL table 321 is a table that associates an ID; contents of instructions to the apparatus; a URL that is position information on the network NW of information relating to the equipment 100, such as support information and/or the like for the equipment 100; and the contents of the URL link.

The information relating to the equipment 100 is, for example, guidance information for supporting error repairs of the equipment 100, guidance information for supporting settings in the equipment 100, information for inquiries to a support center at the manufacturer of the equipment 100 and/or the like. Specifically, information relating to the equipment 100 in this exemplary embodiment is a support page showing the contents of the URL link, a Web page displaying a guidance screen for giving guidance on inquiries to a support center or a screen for repairing operation errors, and/or the like.

For example, when the ID received from the communication apparatus 200 is "10", the information provider 311 transmits the URL "http://www.OO.xxjp/ID10" for the communication apparatus 200 automatically acquiring a Web page of information relating to the equipment 100. On the other hand, when the received ID is "539", the information provider 311 transmits the URL "http://www.OO.xxjp/ID539" for the communication apparatus 200 automatically acquiring a Web page displaying an instruction screen. In addition, when the received ID is "539", the information provider 311 transmits information for instructions for accessing a URL with user information "userinfo=XXXXX" and status information "status=XXXXXX" appended, that is to say instructions for reporting user information and status information to a Web server at the access destination.

On the other hand, returning to the communication apparatus 200, upon transmitting the ID "10" the transceiver 224 receives from the service server 300 the URL "http://www.OO.xxjp/ID10". In addition, upon transmitting the ID "539" the transceiver 224 receives from the service server 300 the URL "http://www.OO.xxjp/ID539".

The information acquirer 225 acquires information relating to the equipment 100, based on the URL received by the transceiver 224. Specifically, the information acquirer 225 automatically makes a request to a Web server for information relating to the equipment 100 shown by the URL without relying on user operation, and acquires information relating to the equipment 100 such as support information and/or the like through the response from the Web server.

In addition, the information acquirer 225 posts language setting information for the communication apparatus 200 to the Web server that is the acquisition source. This language setting information is set by the user of the communication apparatus 200, and the information acquirer 225 specifies the set language setting information by referencing the memory apparatus 230. Through this, information relating to the equipment 100 acquired through the response from the Web server is in a language corresponding to the language settings.

In addition, when a report of user information and status information is indicated from the information provider 311 of the service server 300, the information acquirer 225 reports by including this information. The user information is information on the user using the communication apparatus 200 (for example, email address, telephone number and/or the like), and is registered by the user when installing the application. The status information is information indicating the status of the equipment 100 (for example, usage duration of the equipment 100, error status and/or the like). The information acquirer 225, for the usage duration of the equipment 100, specifies approximate usage duration to the present based on the acquisition date and time in the ID history table, and for the error status, specifies an error status such as that the same errors has occurred within 24 hours based on the rule application condition in the special rule table 233.

The report of the language setting information, the user information, the status information and/or the like by the information acquirer 225 is reported by an arbitrary method, for example, by adding various information in a URL path, or by adding various information in the header of an http request.

Figure 7:
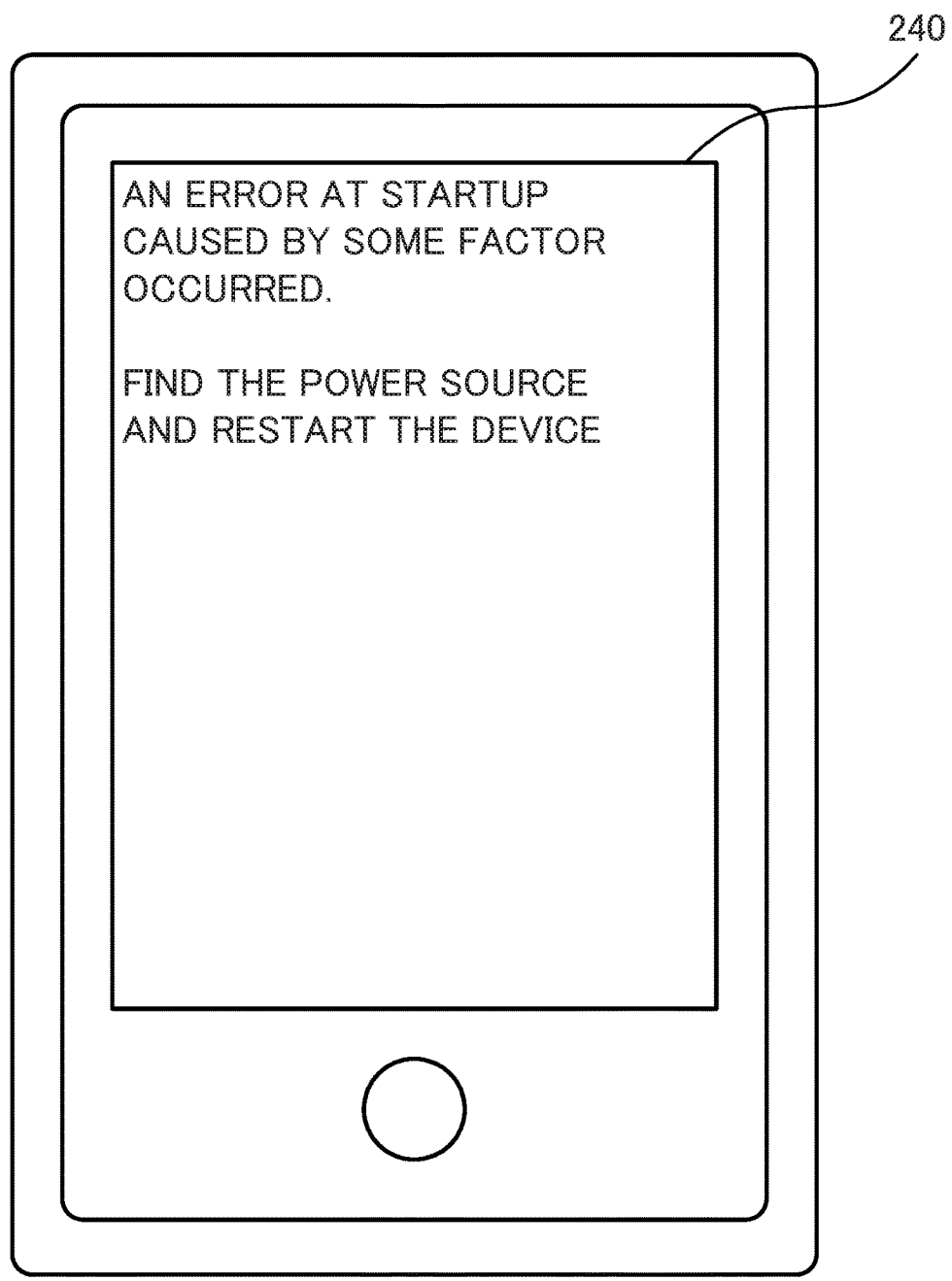
FIG. 7 is a drawing showing one example of information relating to support of the equipment displayed by the communication apparatus.

Next, the display controller 226 displays the information relating to the equipment 100 acquired by the information acquirer 226 on the display device 240. For example, when the information acquirer 225 has acquired a Web page of information relating to the equipment 100 based on the URL "http://www.OO.xxjp/ID10", the display controller 226 displays on the display device 240 a Web page (support page) such as that shown in FIG. 7.

Figure 8A:
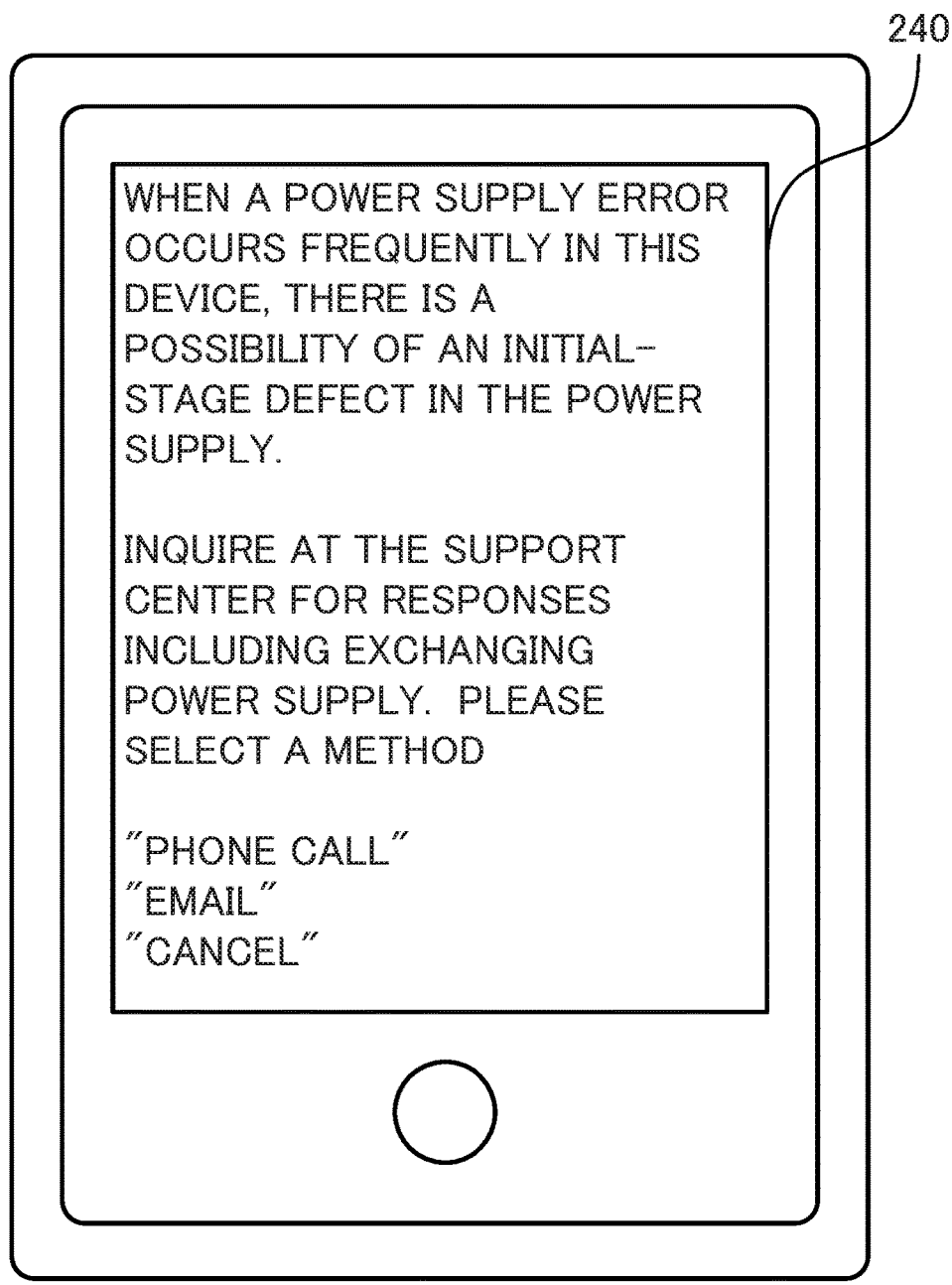
FIG. 8A is a different example of FIG. 7 and is a drawing showing a support center inquiry method selection screen.

On the other hand, when the information acquirer 225 has acquired a Web page displaying a guidance screen based on the URL "http://www.OO.xxjp/ID539", the display controller 226 displays on the display device 240 an inquiry method selection screen to a support center that is a top screen of the Web page, such as shown in FIG. 8A.

Figure 8B:
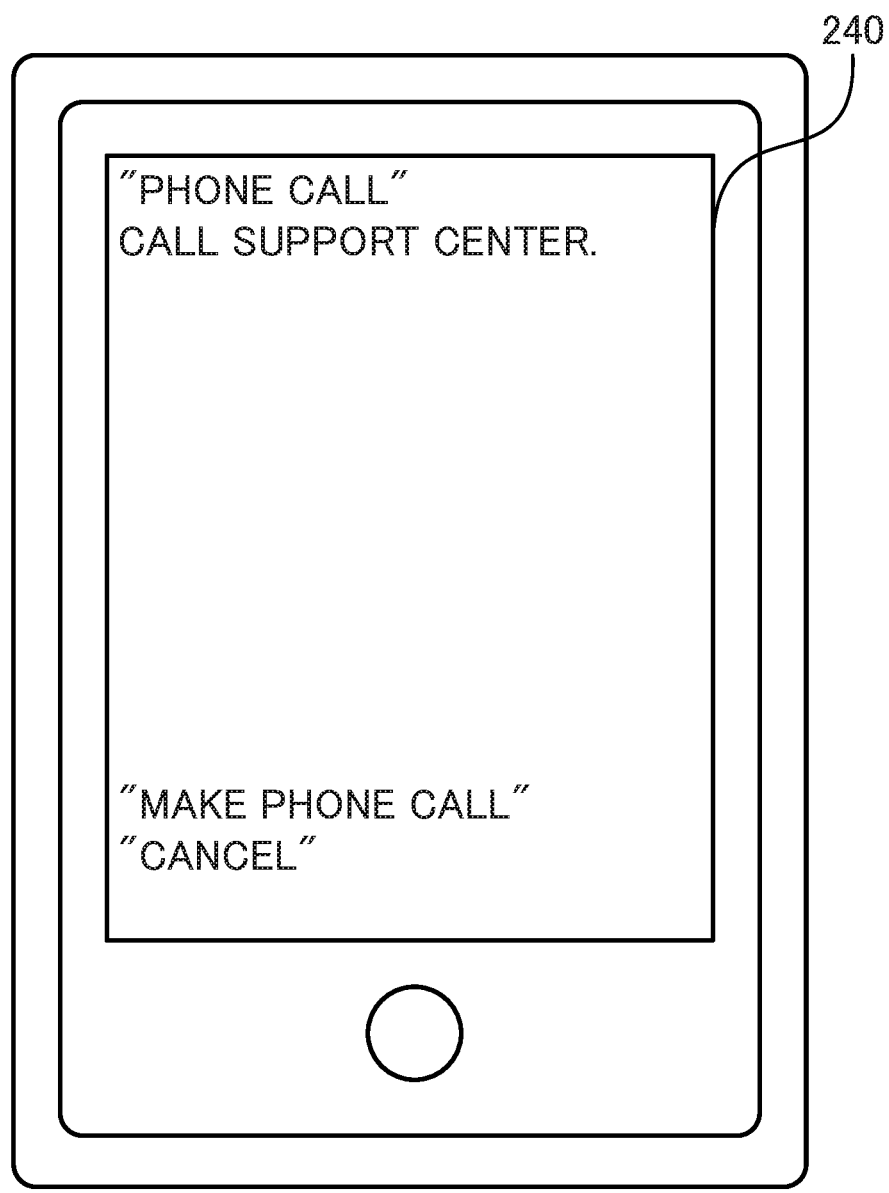
FIG. 8B is a different example of FIG. 7, and is a drawing showing a display screen when phone call is selected.

When the user selects "make phone call", the display controller 226 displays the screen of FIG. 8B. Next, when the user selects "make phone call," the controller 220 of the communication apparatus 200 places a call to the support center. In this exemplary embodiment, the necessary information is acquired by support personnel for support of the equipment 100 in advance in order to facilitate understanding between the user and the support personnel at the support center. For example, the support personnel queries a Web server using the telephone number that called as the key, and acquires the user information and status information from the Web server, or the controller communications the user information and status information through audio data when placing the phone call.

Figure 8C:
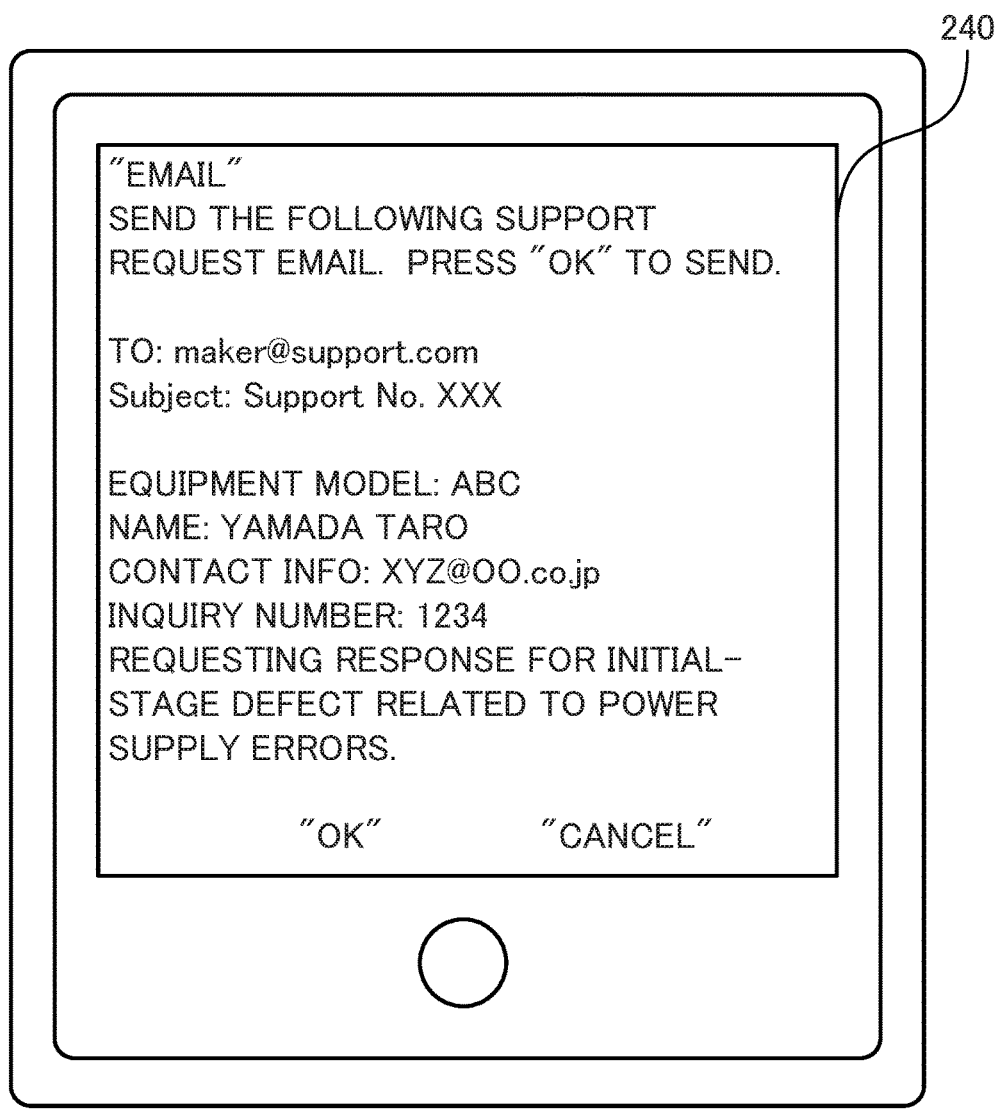
FIG. 8C is a different example of FIG. 7, and is a drawing showing a display screen when email is selected.

On the other hand, when the user selects "send email", the display controller 226 displays the screen of FIG. 8C. The content of the email in the screen was automatically generated by the Web server in accordance with a template, and the personal information (name and contact information) in the email was automatically input by the Web server from user information communicated to the Web server. When the user selects "OK", the controller 220 transmits the email to the address of the support center.

When the screen transitions from FIG. 8A to FIG. 8B or FIG. 8C, it would be fine for the information acquirer 225 to acquire information by querying the Web server to acquire the screen of FIG. 8B or FIG. 8C, and after the screens of FIG. 8A, FIG. 8B and FIG. 8C are once acquired, the display controller 226 may display the screens on the display device 240 in accordance with the user's selection. In addition, the personal information in the email may be input by the communication apparatus 200, instead of the Web server, based on user information.

Returning to FIG. 2, the display device 240 comprises a liquid crystal display, an organic EL (Electroluminescence) display and/or the like. Information relating to support of the equipment 100 such as that shown in FIG. 7 or FIGS. 8A to 8C and/or the like is displayed on the display device 240 under control of the display controller 226.

The input device 250 is a touch panel positioned on the surface of the display device 240 for inputting the user's operation contents. The user registers the user information through the input device 250 when the application is installed. The registered user information is stored in a user information memory device 231 of the memory device 230. The memory device 230, in addition to the user information memory device 231, the ID history table 232 and the special rule table 233 shown in FIG. 2, also stores the language setting information and a table associating the light-emission patterns and the IDs.

Next, the flow of the information acquisition process is described with reference to FIG. 9. The information acquisition process of FIG. 9 is started upon the user pointing the light receiver 210 of the communication apparatus 200 toward the LED 140 of the equipment 100.

First, the ID acquirer 221 acquires an ID (step S11). Specifically, the ID acquirer 221 specifies a light-emission pattern from light received by the light receiver 210 and acquires an ID.

Next, the rule application determiner 223 determines whether or not there is a special rule for the acquired ID (step S12). Specifically, the rule application determiner 223 determines whether or not the ID of the special rule table 233 and the acquired ID match, and determines that there is a special rule when these match and determines that there is no special rule when these do not match.

When the rule application determiner 223 determines that there is no special rule for the acquired ID (step S12: No), the transceiver 224 transmits the acquired ID to the service server 300 (step S13). For example, when the acquired ID is other than "10", which is the ID for which there is a special rule, the transceiver 224 transmits the acquired ID to the service server 300.

On the other hand, when the rule application determiner 223 determines that there is a special rule for the acquired ID (step S12: Yes), the rule application determiner 223 determines whether or not the rule application condition is satisfied (step S14). Specifically, the rule application determiner 223 determines whether or not the rule application condition of the special rule table 233 is satisfied, with reference to the ID history table 232.

When the rule application determiner 223 determines that the rule application condition is not satisfied (step S14: No), the transceiver 224 transmits the acquired ID to the service server 300 (step S13). For example, when the acquisition date and time of the acquired ID "10" is not within 24 hours of the acquisition date and time of the most recent ID history "10", the transceiver 224 transmits the acquired ID "10" to the service server 300.

On the other hand, when the rule application determiner 223 determines that the rule application condition is satisfied (step S14: Yes), the acquired ID is substituted by another ID in accordance with the rule (step S15). Following this, the transceiver 224 transmits the substituted ID to the service server 300 (step S16). For example, when the acquisition date and time of the acquired ID "10" is within 24 hours of the acquisition date and time of the most recent ID history "10", the rule application condition is satisfied, so the ID "539" is substituted for the ID "10" and this substituted ID "539" is transmitted to the service server 300.

Next, after transmitting the acquired ID or the substituted ID to the service server 300, the transceiver 224 waits until receiving a URL corresponding to the ID transmitted to the service server 300 (step S17: No). When the transceiver 224 receives a URL corresponding to the transmitted ID from the service server 300 (step S17: Yes), the information acquirer 225 acquires information relating to the equipment 100 based on the URL (step S18) and the information acquisition process concludes.

For example, when the received URL is "http://www.OO.xxjp/ID10" corresponding to the ID "10", the information acquirer 225 acquires the Web page of the equipment 100. In addition, when the received URL is the URL "http://www.OO.xxjp/ID539" corresponding to the ID "539", the Web page displaying the guidance screen is acquired. The information acquirer 225 is as described above on:

1) the point that in either case, the language setting information is communicated to the Web server at the acquisition source, and
2) the point that when there is a communication instruction for the user information and the status information from the service server 300, that information is communicated to the Web server.

In addition, after the information acquisition process of FIG. 9, the display controller 226 displays the acquired information on the display device 240.

Next, the ID space stored by the memory device 320 of the service server 300 is described with reference to FIG. 10. When each manufacturer wants to provide information relating to support of that manufacturer's equipment using the service server 300, assignment of IDs is done in advance through the manager of the service server 300. Furthermore, URLs are associated to the assigned IDs (see the ID/URL table 321 of FIG. 6). Through this, the information provider 311 can provide information in response to inquiries from the communication apparatus 200 on which the application is installed.

The service sever 300 can cope with equipment from multiple manufacturers through assignment of IDs by the manager. On the other hand, the user of the communication apparatus 200 receives the corresponding URL by transmitting the acquired ID without being particularly aware of the equipment of each manufacturer, if the application is installed. For the unassigned range of IDs in the drawings, it is possible for the manager to assign temporary IDs in accordance with requests from each manufacturer.

In addition, under specific conditions for the IDs already assigned in this ID space, there are cases when the desire is to provide as information the URL associated with a different ID. For example, there are cases where although a URL has been set for an ID already assigned, it is discovered after the fact that an error on the equipment 100 side corresponding to this ID occurs frequently, and information different from the information relating to support shown by the above-described URL must be provided to the user.

To cope with such cases, in this exemplary embodiment, it is possible to set a special rule for an ID already assigned in the ID space. FIG. 11 is a drawing showing an entry for this special rule. This entry is accomplished by the manufacturer that wants to set the special rule communicating with the manager, and the entry region is a different memory region from the memory region occupied by the ID space.

The special rule comprises an entry date and time, an ID mapping range, an ID, a rule application condition and an application rule. The entry date and time indicates the date and time the special rule was entered, the ID mapping range indicates the range of the ID group containing the ID to which the special rule applies, the ID indicates the ID to which the special rule applies, the rule application condition indicates a specific condition for the rule being applied, and the application rule indicates the ID substituted when the rule application condition is satisfied.

The manufacturer communicates to the manager a URL and/or the like associated with the ID for substitution along with the entry of the special rule. For example, when the ID "539" is unregistered in the ID/URL table 321 of FIG. 6, the manufacturer communicates to the manager the entry of the special rule of FIG. 11 along with the ID "539" and a URL and/or the like associated therewith, and the manager registers each of these.

In this exemplary embodiment, the rule application determiner 223 of the communication apparatus 200 determines whether or not the rule application condition is satisfied (the service server 300 does not make application determinations for rules), so it is necessary to synchronize the registered special rules with the communication apparatus 200.

Figure 12:
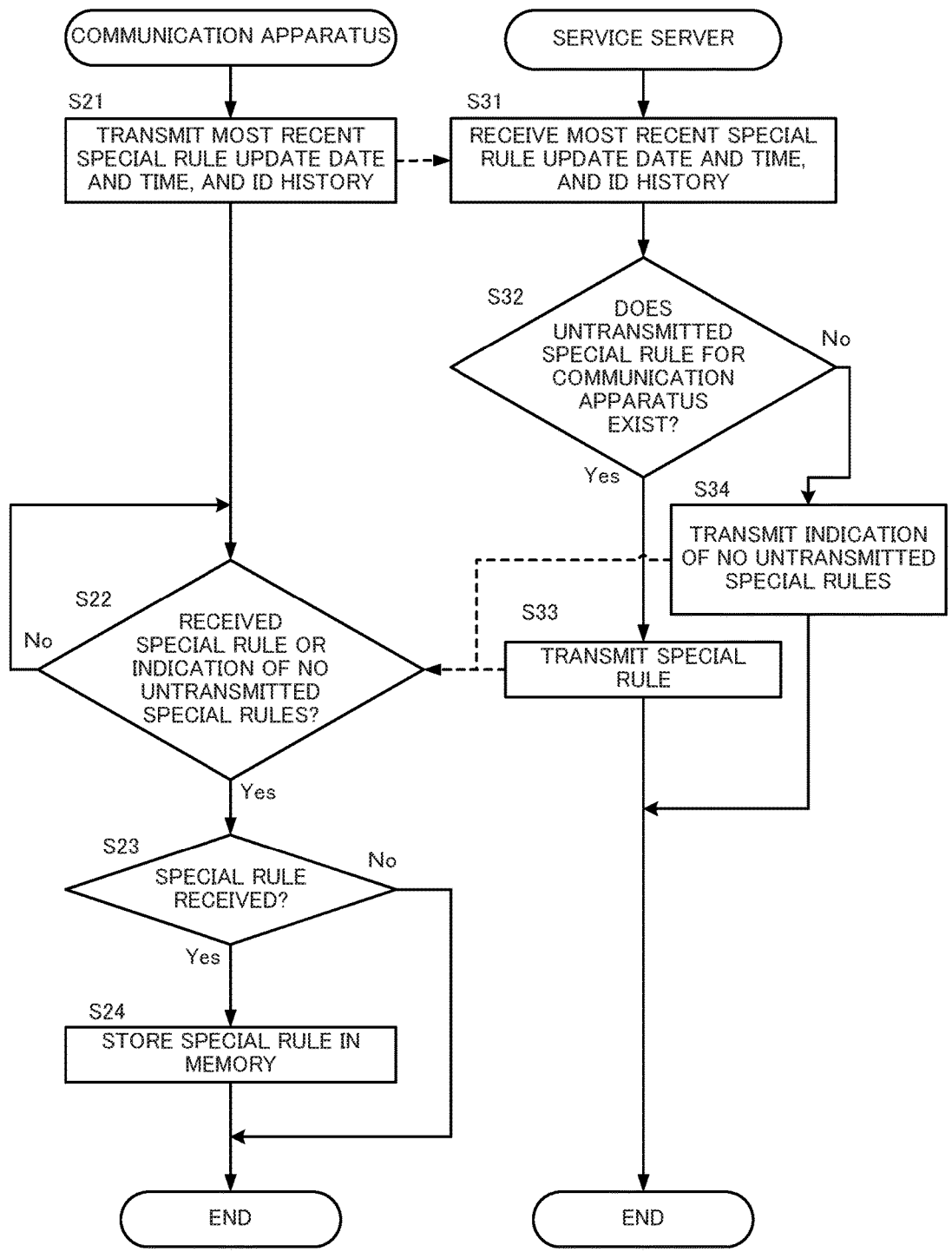
FIG. 12 is a flowchart showing one example of the flow of the synchronization process for the special rule accomplished between the communication apparatus and a service server.

This synchronization process is described with reference to FIG. 12. FIG. 12 is a flowchart showing one example of the flow of the synchronization process for special rules accomplished between the communication apparatus 200 and the service server 300. When the communication apparatus 200 accomplishes the synchronization process at fixed intervals and there is a special rule on the service server 300, synchronization is done automatically. The timing of accomplishing the synchronization process at fixed intervals is for example at prescribed times, when the communication acquisition process is started with the receiver 210 of the communication apparatus 200 being pointed at the LED 140, a determination is made as to whether or not there is a special rule for the ID acquired in step S12 of the information acquisition process.

First, the controller 220 of the communication apparatus 200 transmits the most recent update date and time of the special rules and the ID history (step S21).

Next, the controller 310 of the service server 300 receives the most recent update date and time of the special rules and the ID history (step S31), and determines whether or not there is a special rule that has not been transmitted to the communication apparatus 200 (step S32). Specifically, the controller 310 of the service server 300 references the entry date and time of the special rule of FIG. 11, and determines the absence or presence of an untransmitted special rule by whether or not there is a special rule entered later than the most recent update date and time of the special rules and whether or not the ID history received is contained in the ID mapping range.

When the controller 310 of the service server 300 determines that there is no untransmitted special rule (step S32: No), the fact that there is no untransmitted special rule is transmitted (step S34) and the process concludes. Specifically, when there is a special rule entered before the most recent update date and time of the special rule or when the received ID history is not included in the ID mapping range, the controller 310 of the service server 300 transmits information showing that there is no untransmitted special rule to the communication apparatus 200, and the process concludes.

On the other hand, when the controller 310 of the service server 300 determines that there is an untransmitted special rule (step S32: Yes), the special rule is transmitted (step S33) and the process concludes. Specifically, when there is a special rule entered later than the most recent update date and time of the special rule and the received ID history is included in the ID mapping range, the controller 310 of the service server 300 transmits the special rule to the communication apparatus 200, and the process concludes.

Next, the controller 220 of the communication apparatus 200 waits until receiving the fact that there is no untransmitted special rule or receiving a special rule (step S22: No), and upon receiving either (step S22: Yes), determines whether or not what was received is a special rule (step S23). When what was received is a special rule (step S23: Yes), the controller 220 stores the special rule in memory (step S24) and concludes the process. On the other hand, when what was received is that there is no special rule (step S23: No), the controller 220 concludes the process.

Above, the synchronization process of FIG. 12 was described based on a specific example.

As one example, suppose the case in which the special rule of FIG. 11 is newly entered into the service server 300, and that the communication apparatus 200 has not yet done special rule synchronization, that is to say that there is no special rule table 233.

In this case, the controller 220 of the communication apparatus 200 is in a state with no most recent special rule and thus transmits the ID histories "10" and "11" with reference to the ID history table 232 (step S21). The controller 310 of the service server 300 determines whether or not there is an untransmitted special rule based on the ID histories "10" and "11" received (step S32). Because the ID histories "10" and "11" are included in the ID mapping range 10-40 of FIG. 11, the controller 310 determines that there is an untransmitted special rule (step S32: Yes), and transmits the special rule to the communication apparatus 200 (step S33). The controller 220 of the communication apparatus 200 that receives the special rule stores the special rule table 233 of FIG. 5 in the memory device 230.

Above, the information acquisition process in the communication apparatus 200 of the communication system 10 and the synchronization process between the communication apparatus 200 and the service server 300 were described.

First, in the information acquisition process, the communication apparatus 200 can specify the light-emission pattern from light received by the receiver 210, acquire the ID and acquire information relating to the equipment 100 based on the URL corresponding to that ID. The ID defines the light-emission pattern and simultaneously corresponds to the status of the equipment 100. That is to say, from the user's perspective, by simply pointing the communication apparatus 200 toward the flashing LED 140, it is possible to acquire an ID corresponding to the status of the equipment and it is possible to automatically acquire information relating to support based on the URL corresponding to the ID. Accordingly, it is not necessary for the user to analyze the basic cause such as an error and/or the like, making it possible to provide detailed support in accordance with the status while also making convenience good.

In addition, when the communication apparatus 200 acquires information relating to support of the equipment 100, prescribed information is communicated to the Web server that is the acquisition source. Consequently, it is possible for the Web server to use prescribed information communicated when providing information relating to support. For example, by using the communicated user information and covering places where user input is necessary, it is possible to use user information and status information while eliminating the effort of user input or for support personnel to query the Web server using as a key the telephone number prior to receiving an inquiry from the user. Accordingly, it is possible to provide more detailed support.

Next, in the synchronization process, it is possible for the communication apparatus 200 to reflect special rules entered into the service server 300. Furthermore, the communication apparatus 200 determines whether or not the acquired ID satisfies the rule application condition of the special rule in the information acquisition process, and when the rule is satisfied, to substitute a different ID, transmit such to the service server 300 and receive a URL corresponding to the different ID. From the perspective of the manufacturer of the equipment 100, even when a fatal difficulty relating to errors in ID is discovered after the fact under specific conditions, by simply entering that specific condition into the service server 300 as a special rule, it is possible to guide the user to separate information relating to support. Accordingly, it is possible provide even more detailed support.

In addition, the equipment 100 in this exemplary embodiment is not provided with a display device such as a display, but by incorporating the above-described special ASIC for visible light communication and/or the like into the equipment 100 in advance, it is possible to accomplish visible light communication with the communication apparatus 200 by causing the LED 140 to flash with a light-emission pattern in accordance with the status of the equipment 100. Consequently, it is possible even for equipment 100 such as an information appliance and/or the like not equipped with a display device to communicate its own status to the outside inexpensively. However, this does not prevent use of equipment equipped with a display device (for example, video equipment, a PC and/or the like). Even with this kind of equipment equipped with a display device, the present disclosure is adequately effective when the power supply to the display device is cut, or when making a display becomes impossible to due to a fatal difficulty, and/or the like.

In addition, in this exemplary embodiment, the rule application determination is accomplished in the communication apparatus 200, so the service server 300 does not need to store in memory the ID history table necessary to accomplish this determination. When the determination is accomplished on the service server 300 side, it is necessary to accomplish the determination of whether or not the rule application condition for the special rule is satisfied by referencing the ID history for each user, so it is necessary to store an ID history table for multiple users who use the application. Consequently, by accomplishing the rule application determination after each of multiple communication apparatuses have stored the ID history table in memory, it is possible to control the memory volume on the service server 300 side while reducing the processing burden. However, this does not prevent the ID history table for each user being stored and the rule application determination being accomplished on the service server 300 side.

In this exemplary embodiment, the rule application condition of the special rule table 233 took as a condition that "the same error occurs within 24 hours," but it would be fine to have other conditions. For example, it would be fine to have a condition combining the time and order of multiple IDs (for example, that the ID "11" is acquired within 12 hours after acquisition of the ID "10", and/or the like). In addition, when the equipment 100 is a PC, and when the PC can detect errors in a network device (for example, a router and/or the like) or an access point (for example, a Wi-Fi access point and/or the like) of the network NW, it would be fine to communicate this to the outside by causing an LED to flash in a light-emission pattern corresponding to the error in the peripheral other than the device itself. In this case, it would be fine have a combination of multiple IDs corresponding to multiple peripheral errors as the rule application condition for the special rule.

(Variation)

The above concludes explanation of the exemplary embodiment, but naturally, the specific composition of the communication system 10 and the contents of the information acquisition process and the synchronization process are not limited to those explained in the above-described exemplary embodiment.

Figure 13:
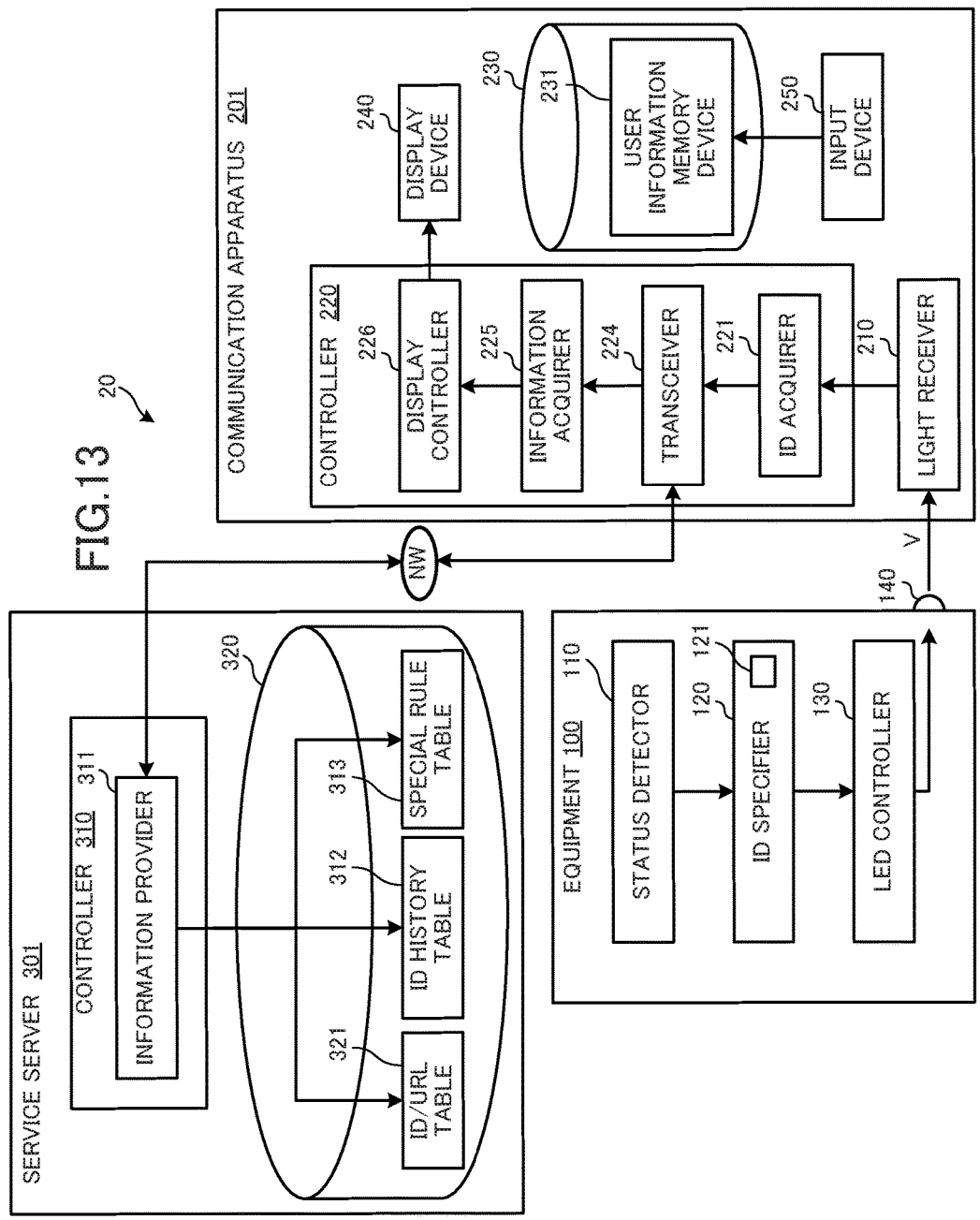
FIG. 13 is a block diagram showing a variation of the composition of the communication system.

For example, it is possible to make the communication system 10 like a communication system 20 shown in FIG. 13. This communication system 20 is a variation of the communication system 10 in which the determination of whether or not the rule application condition for the special rule is satisfied is accomplished by a service server 301. The points of difference from the communication system 10 are the composition of a communication apparatus 201 and the service server 301, so the explanation will primarily be for these points of difference.

The communication apparatus 201 differs from the communication apparatus 200 in not being provided with the components (the ID accumulator 222 and the rule application determiner 223) necessary for rule application determination, or the ID history table 232 and the special rule table 233 of the memory device 230.

The communication apparatus 201 is such that when the ID acquirer 221 acquires an ID, the transceiver 224 transmits the ID and the user ID that is identifying information for identifying the user of the communication apparatus 201. Furthermore, the transceiver 224 receives from the service server 301 the URL corresponding to that ID or, when a different ID is substituted by the service server 301, the URL corresponding to that different ID. Furthermore, the information acquirer 225 acquires information relating to the equipment 100 based on the URL received.

The service server 301 differs from the service server 300 in that the information provider 311 accomplishes the rule application determination, and is provided with tables (an ID history table 312 and a special rule table 313) necessary for that rule application determination.

The ID history table 213 stores an ID history for each user ID in order to cope with users of multiple communication apparatuses other than the communication apparatus 201, as shown in FIG. 14. The special rule table 313 is the same as that shown in FIG. 5. When the ID and the user ID are received, if the ID received is the same as an ID in the special rule table 313, the information provider 311 determines whether or not the rule application condition is satisfied with reference to the ID history corresponding to the user ID received. Furthermore, the information provider 311 specifies the URL corresponding to the received ID or the URL corresponding to the substituted ID in the ID/URL table 321 in accordance with this determination and transmits the specified URL to the communication apparatus (for example, the communication apparatus 201) that is the transmission destination.

In the communication system 20 according to this variation, the rule application determination is accomplished on the service server 301 side, so it is not necessary to accomplish a synchronization process between the service server 301 and the communication apparatus 201. Consequently, the communication burden between the service server 301 and the communication apparatus 201 can be reduced.

In the above-described exemplary embodiment, the explanation assumed that visible light communication was accomplished through flashing of the LED 140 by luminosity modulation, but this is intended to be illustrative and not limiting. For example, it would be fine to accomplish visible light communication through changes in the color of the LED 140 by wavelength modulation. In this case, color-change patterns are made to correspond to each status of the equipment 100 in advance. In addition, it would also be fine to accomplish communication through wireless communication other than visible light communication (for example, infrared ray communication, ultraviolet ray communication and/or the like).

In addition, in the above-described exemplary embodiment, the explanation assumed that the ID space shown in FIG. 10 was such that a different ID was assigned to each piece of equipment, but this is intended to be illustrative and not limiting. For example, even if the equipment differs, when the same error occurs and guidance to the same URL is possible, it would be fine for two pieces of equipment to share the same ID. For example, it is conceivable that the ID "10" of the equipment 100 could be used as an ID of another piece of equipment.

In addition, in the above-described exemplary embodiment, when the information acquirer 225 of the communication apparatus 201 acquires the information relating to support of the equipment 100, the language setting information, user information, status information and/or the like were communicated to the Web server of the acquisition source, but this is intended to be illustrative and not limiting. For example, when the communication apparatus 201 has a GPS function, it would be fine to communicate the position information of the communication apparatus 201 as well. The support personnel for example acquires the position information along with the user information and the status information from the Web server using the telephone number as a key.

Through this, when the support personnel answers the telephone, it is possible to provide support taking into consideration the location of the communication apparatus 201.

In addition, in the above-described exemplary embodiment, the explanation assumed a single piece of equipment 100, but naturally, it would be fine to have visible light communication between the communication apparatus 200 (201) and other equipment besides the equipment 100. In this case, it is possible to acquire information relating to support of the other equipment if 1) IDs are assigned to the other equipment in advance in the ID space of the service server 300 (301);
2) the LED of the other equipment emits light with light emission patterns corresponding to the assigned IDs; and
3) the communication apparatus 200 (201) has the application installed.

The IDs assigned with the ID space are unique, so from the user's perspective, if the application is installed, there is no need to be aware of the manufacturer or equipment. That is to say, it is not necessary for the communication apparatus 200 (201) to acquire information (for example, equipment ID) for identifying the equipment 100 and the other equipment.

In addition, in the above-described exemplary embodiment, the explanation assumed that the communication apparatus 200 was a mobile phone or smartphone, but this is intended to be illustrative and not limiting. It would be fine for the apparatus to be a tablet PC, PDA (Personal Digital Assistant) and/or the like provided with a light receiver such as an image sensor and/or the like (for example equipped with an imaging function).

In addition, the information acquisition process and the synchronization process of the present disclosure can be implemented through a computer such as a PC and/or the like. Specifically, in the above-described exemplary embodiment, a program for realizing the information acquisition process and the synchronization process was described as stored in advance on the ROM of the controller 220. However, it would be fine to comprise a computer capable of realizing the functions of the above-described components by storing and distributing this program on a computer-readable non-transitory recording medium such as a flexible disk, a CD-ROM (Compact Disc Read Only Memory), a DVD (Digital Versatile Disc), an MO (Magneto-Optical Disc) and/or the like and installing this program on the computer.

In addition, it would be fine to store the program on a memory device and/or the like possessed by a server on a communication network such as the Internet and/or the like, and for example to enable a computer to download and/or the like the program.

Having described and illustrated the principles of this application by reference to one exemplary embodiment, it should be apparent that the exemplary embodiment may be modified in arrangement and detail without departing from the principles disclosed herein and that it is intended that the application be construed as including all such modifications and variations insofar as they come within the spirit and scope of the subject matter disclosed herein.

This application claims the benefit of Japanese Patent Application No. 2013-231138, filed on Nov. 7, 2013, the entire disclosure of which is incorporated by reference herein.

REFERENCE SIGNS LIST

10 Communication system
20 Communication system
100 Equipment
110 Status detector
120 ID specifier
121 Light-emission pattern table
130 LED controller
140 LED
200 Communication apparatus
201 Communication apparatus
210 Light receiver
220 Controller
221 ID acquirer
222 ID accumulator
223 Rule application determiner
224 Transceiver
225 Information acquirer
226 Display controller
230 Memory device
231 User information memory device
232 ID history table
233 Special rule table
240 Display device
250 Input device
300 Service server
301 Service server
310 Controller
311 Information provider
312 ID History table
313 Special rule table
320 Memory device
321 ID/URL table

The invention claimed is:

1. A communication apparatus comprising:
a light receiver configured to receive light from a light-emitting body that emits light based on light-emission patterns defined by definition information, wherein the light emitting body is provided to an equipment, and the equipment is configured to detect a state thereof, and, in accordance with a result of the detection, to control the light-emitting body to emit light based on the light-emission patterns defined by the definition information; and
a processor which is configured to:
specify the light-emission patterns from light received by the light receiver and acquire the definition information; and
transmit the acquired definition information to a server outside the communication apparatus, and acquire information relating to the equipment equipped with the light-emitting body, based on results of a response to the transmission;
wherein the server stores and associates the definition information and position information on a network of information relating to the equipment equipped with the light-emitting body;
wherein the communication apparatus further comprises a transceiver configured to transmit, under control of the processor, the acquired definition information to the server and to receive the position information from the server;
wherein the processor acquires the information relating to the equipment, based on the position information received by the transceiver;
wherein the processor is further configured to determine whether or not the acquired definition information satisfies a prescribed condition; and
wherein when the processor determines that the definition information satisfies the prescribed condition, the processor controls the transceiver to substitute different definition information for the definition information and transmit the different definition information to the server, and receive, from the server, position information corresponding to the different definition information.

2. The communication apparatus according to claim 1, wherein the processor, upon acquiring information relating to the equipment, communicates prescribed information to an acquisition source.

3. The communication apparatus according to claim 2, wherein the prescribed information includes at least one out of language setting information when the information relating to the equipment is displayed on a display of the communication apparatus, user information about a user using the communication apparatus, or information indicating a status of the equipment.

4. The communication apparatus according to claim 1, wherein the information relating to the equipment includes at least one out of information for supporting error repairs of the equipment, information for supporting settings on the equipment, or inquiries to a support center of a manufacturer of the equipment.

5. The communication apparatus according to claim 1, wherein the light-emission patterns are patterns of color changes in visible light or patterns of luminosity changes in visible light.

6. A server in a communication system, the communication system comprising (i) equipment equipped with a light-emitting body for emitting light based on light-emission patterns defined by definition information, wherein the equipment is configured to detect a state thereof, and, in accordance with a result of the detection, to control the light-emitting body to emit light based on the light-emission patterns defined by the definition information, (ii) the server, which associates the definition information and information relating to the equipment existing on a network, and (iii) a communication apparatus equipped with a light receiver for receiving light from the light-emitting body, the server comprising:

a processor configured to:
 receive definition information defining the light-emission patterns from the communication apparatus that receives light having the light-emission patterns;
 enable information relating to the equipment to be received by the communication apparatus, based on the received definition information; and
 associate together and manage the definition information and position information on the network of the information relating to the equipment;

wherein the processor enables acquisition of the information relating to the equipment by the communication apparatus by reading out the position information on the network of the information relating to the equipment, based on the received definition information, and transmitting the position information to the communication apparatus;

wherein the processor further associates together and manages the definition information, a prescribed condition relating to the definition information, different definition information that is substituted as the definition information when the prescribed condition is satisfied, and position information corresponding to the different definition information; and wherein the server further comprises:
 a first transmitter configured to transmit the definition information, the prescribed condition and the different definition information to the communication apparatus in accordance with a request from the communication apparatus; and
 a second transmitter configured to receive the different definition information received from the communication apparatus, and to transmit the position information corresponding to the different definition information to the communication apparatus.

7. A communication method for a communication apparatus comprising a light receiver, the method comprising:
 receiving, with the light receiver, light from a light-emitting body that emits light based on light-emission patterns defined by definition information, wherein the light emitting body is provided to an equipment, and the equipment is configured to detect a state thereof, and, in accordance with a result of the detection, to control the light-emitting body to emit light based on the light-emission patterns defined by the definition information;
 specifying the light-emission pattern from the received light and acquiring the definition information; and
 transmitting the acquired definition information to a server, and acquiring information relating to the equipment equipped with the light-emitting body, based on results of a response to the transmission,
 wherein the server stores and associates the definition information and position information on a network of information relating to the equipment equipped with the light-emitting body; and wherein the method further comprises:
 transmitting the acquired definition information to the server and receiving the position information from the server;
 acquiring the information relating to the equipment, based on the received position information;
 determining whether or not the acquired definition information satisfies a prescribed condition; and
 when it is determined that the definition information satisfies the prescribed condition, substituting different definition information for the definition information and transmitting the different definition information to the server, and receiving, from the server, position information corresponding to the different definition information.

8. A non-transitory recording medium on which a computer-readable program is recorded, the program controlling a computer to perform functions comprising:
 specifying light-emission patterns of light received by a light receiver and which is emitted from a light-emitting body, and acquiring definition information defining the light-emission patterns, wherein the light emitting body is provided to an equipment, and the equipment is configured to detect a state thereof, and, in accordance with a result of the detection, to control the light-emitting body to emit light based on the light-emission patterns defined by the definition information; and
 transmitting the acquired definition information to a server outside the computer, and acquiring information relating to the equipment equipped with the light-emitting body, based on results of a response to the transmission;
 wherein the server stores and associates the definition information and position information on a network of information relating to the equipment equipped with the light-emitting body; and
 wherein the program further controls the computer to perform functions comprising:
 transmitting the acquired definition information to the server and receiving the position information from the server;
 acquiring the information relating to the equipment, based on the received position information;
 determining whether or not the acquired definition information satisfies a prescribed condition; and
 when it is determined that the definition information satisfies the prescribed condition, substituting different definition information for the definition information and transmitting the different definition information to the server, and receiving, from the server, position information corresponding to the different definition information.

9. A communication apparatus comprising:
a light receiver configured to receive light from a light-emitting body that emits light based on light-emission patterns defined by definition information; and
a processor which is configured to:
specify the light-emission patterns from light received by the light receiver and acquire the definition information; and
transmit the acquired definition information to a server outside the communication apparatus, and acquire information relating to equipment equipped with the light-emitting body, based on results of a response to the transmission;

wherein:
the server stores and associates the definition information and position information on a network of information relating to the equipment equipped with the light-emitting body;
the communication apparatus further comprises a transceiver configured to transmit, under control of the processor, the acquired definition information to the server and to receive the position information from the server;
the processor acquires the information relating to the equipment, based on the position information received by the transceiver;
the processor is further configured to determine whether or not the acquired definition information satisfies a prescribed condition; and
when the processor determines that the definition information satisfies the prescribed condition, the processor controls the transceiver to substitute different definition information for the definition information and transmit the different definition information to the server, and receive, from the server, position information corresponding to the different definition information.

10. The communication apparatus according to claim 9, wherein the processor, upon acquiring information relating to the equipment, communicates prescribed information to an acquisition source.

11. The communication apparatus according to claim 10, wherein the prescribed information includes at least one out of language setting information when the information relating to the equipment is displayed on a display of the communication apparatus, user information about a user using the communication apparatus, or information indicating a status of the equipment.

12. The communication apparatus according to claim 9, wherein the information relating to the equipment includes at least one out of information for supporting error repairs of the equipment, information for supporting settings on the equipment, or inquiries to a support center of a manufacturer of the equipment.

13. The communication apparatus according to claim 9, wherein the light-emission patterns are patterns of color changes in visible light or patterns of luminosity changes in visible light.

14. A communication system comprising:
equipment equipped with a light-emitting body for emitting light based on light-emission patterns defined by definition information;
a server that associates the definition information and information relating to the equipment existing on a network; and
a communication apparatus equipped with a light receiver configured to receive light from the light-emitting body;
wherein:
the communication apparatus comprises:
a processor configured to specify the light-emission patterns from light received by the light receiver and acquire the definition information; and
a transceiver configured, under control of the processor, to transmit to the server the acquired definition information;
the server comprises a processor configured to:
receive the definition information transmitted by the communication apparatus; and
cause the information relating to the equipment to become acquirable by the communication apparatus, based on the received definition information;
the processor of the communication apparatus is further configured to acquire the information relating to the equipment as a result of the processor of the server accomplishing control to cause the information relating to the equipment to become acquirable by the communication apparatus;
the server stores the definition information and position information on the network of the information relating to the equipment, in association with each other;
the processor of the server reads out the position information on the network of the information relating to the equipment, based on the received definition information, and transmits the position information to the communication apparatus, thereby enabling acquisition of the information relating to the equipment by the communication apparatus;
the processor of the communication apparatus is further configured to determine whether or not the acquired definition information satisfies a prescribed condition; and
when the processor of the communication apparatus determines that the definition information satisfies the prescribed condition, the processor of the communication apparatus controls the transceiver to substitute different definition information for the definition information and transmit the different definition information to the server, and receive, from the server, position information corresponding to the different definition information.

15. A server in a communication system, the communication system comprising (i) equipment equipped with a light-emitting body for emitting light based on light-emission patterns defined by definition information, (ii) the server, which associates the definition information and information relating to the equipment existing on a network, and (iii) a communication apparatus equipped with a light receiver for receiving light from the light-emitting body, the server comprising:
a processor configured to:
receive definition information defining the light-emission patterns from the communication apparatus that receives light having the light-emission patterns;
enable information relating to the equipment to be received by the communication apparatus, based on the received definition information; and
associate together and manage the definition information and position information on the network of the information relating to the equipment;
wherein:
the processor enables acquisition of the information relating to the equipment by the communication apparatus by reading out the position information on the network of the information relating to the equipment, based on the received definition information, and transmitting the position information to the communication apparatus;
the processor further associates together and manages the definition information, a prescribed condition relating to the definition information, different definition information that is substituted as the definition information when the prescribed condition is satisfied, and position information corresponding to the different definition information; and the server further comprises:
- a first transmitter configured to transmit the definition information, the prescribed condition and the different definition information to the communication apparatus in accordance with a request from the communication apparatus; and
- a second transmitter configured to receive the different definition information received from the communication apparatus, and to transmit the position information corresponding to the different definition information to the communication apparatus.

16. A communication method for a communication apparatus comprising a light receiver, the method comprising:
- receiving, with the light receiver, light from a light-emitting body that emits light based on light-emission patterns defined by definition information;
- specifying the light-emission pattern from the received light and acquiring the definition information; and
- transmitting the acquired definition information to a server, and acquiring information relating to equipment equipped with the light-emitting body, based on results of a response to the transmission;

wherein:
the server stores and associates the definition information and position information on a network of information relating to the equipment equipped with the light-emitting body;

the method further comprises:
- transmitting the acquired definition information to the server and receiving the position information from the server;
- acquiring the information relating to the equipment, based on the received position information;
- determining whether or not the acquired definition information satisfies a prescribed condition; and
- when it is determined that the definition information satisfies the prescribed condition, substituting different definition information for the definition information and transmitting the different definition information to the server, and receiving, from the server, position information corresponding to the different definition information.

17. A non-transitory recording medium on which a computer-readable program is recorded, the program causing a computer to perform functions comprising:
- specifying light-emission patterns of light received by a light receiver and which is emitted from a light-emitting body, and acquiring definition information defining the light-emission patterns; and
- transmitting the acquired definition information to a server outside the computer, and acquiring information relating to equipment equipped with the light-emitting body, based on results of a response to the transmission;

wherein:
the server stores and associates the definition information and position information on a network of information relating to the equipment equipped with the light-emitting body;

the program causes the computer to perform further functions comprising:
- transmitting the acquired definition information to the server and receiving the position information from the server;
- acquiring the information relating to the equipment, based on the received position information;
- determining whether or not the acquired definition information satisfies a prescribed condition; and
- when it is determined that the definition information satisfies the prescribed condition, substituting different definition information for the definition information and transmitting the different definition information to the server, and receiving, from the server, position information corresponding to the different definition information.

* * * * *